United States Patent Office 3,393,085
Patented July 16, 1968

3,393,085
THERMALLY STABLE CARBON ARTICLES
Ronald A. Howard and George C. Tolley, Lawrenceburg, Tenn., assignors to Union Carbide Corporation, a corporation of New York
No Drawing. Filed July 6, 1962, Ser. No. 208,123
3 Claims. (Cl. 117—46)

The present invention relates generally to thermally stable carbon articles and, more particularly, to a coated carbon article that is substantially isotropic with respect to the coefficient to thermal expansion and to an isotropic carbon substrate for such a coated article.

As used herein, the term "carbon" refers to materials known in the art as carbon, coke and graphite.

Heretofore, various forms of carbon have been widely used as substrates for many coatings to be used in high-temperature applications. The coefficient of thermal expansion is especially important in evaluating such carbon substrates and the coating materials to be used therewith because any mismatch in this coefficient between the substrate and coating materials gives rise to strains in the coated article which ultimately crack the coating upon cooling from elevated temperatures. The same result follows if the substrate has a relatively high coefficient of thermal expansion in one direction but a relatively low coefficient in other directions, i.e., if the substrate is not isotropic. A great variety of carbon substrates have been used heretofore, but most of them have a relatively low coefficient of thermal expansion and are not isotropic. Although such materials are suitable for use as substrates for many coating materials, there has been an increasing need for an isotropic carbon substrate having a relatively high coefficient of thermal expansion. For example, silicon carbide, which has recently become popular as a coating material for various high-temperature uses has a polycrystalline coefficient of thermal expansion of about $5 \times 10^{-6} °C.^{-1}$ over the temperature range of 400 to 1000° C. In order to prevent cracking of silicon carbide coatings at high temperatures, it is important to apply the coatings to an isotropic substrate which has a coefficient of thermal expansion which is approximately the same as the coefficient of thermal expansion of the coating.

It is, therefore, the main object of the present invention to provide a coated carbon article that is isotropic and has a relatively high coefficient of thermal expansion.

It is another object of the invention to provide an improved carbon substrate.

It is a further object of the invention to provide a carbon substrate suitable for use with silicon carbide coatings, even at elevated temperatures.

Other aims and advantages of the invention will be apparent from the following description and appended claims.

In accordance with the present invention, there is provided a thermally stable coated article comprising a layer of a coating material that is isotropic with respect to the coefficient of thermal expansion of the substrate and which is bonded to an isotropic carbon substrate comprising a plurality of fine spherical carbon particles held together by a carbonaceous binder and a suitable filler material. The coated article is prepared by forming a mixture of fine spherical carbon particles, a carbonaceous binder, and a suitable filler material into the desired substrate shape and then applying a coating of a suitable material thereto. The inventive article is thermally stable. For example, the article can be subjected to thermal shock and/or extremely high temperatures without any cracking or splitting resulting therefrom.

The fine spherical carbon particles employed in the carbon substrate in the inventive article are preferably calcined gilsonite coke and graphitized fluid coke. Gilsonite is a mineral made up of about 50% resinous and 50% asphaltic materials and rich in nitrogen-free base materials (about 4%). Calcined gilsonite coke is commercially available and is usually prepared by coking the natural gilsonite in a delayed coker and then calcining the resulting coke at about 1350° C. Since the gilsonite is transported to the coker in a slurry of finely divided gilsonite particles and a recycle oil at a temperature above the softening point of the gilsonite, the gilsonite particles are formed into fine spheres. After the gilsonite particles have been coked and calcined, they are generally fine spongy spheres with irregular surfaces.

Fluid coke is petroleum coke in the form of fine particles having a shell-like structure, generally of several layers. Fluid coke is commercially available and is usually produced in a fluid-bed petroleum cracker. A few typical examples of processes for producing fluid coke are described in United States Patents Nos. 2,456,796 and 2,623,010.

The degree of isotropy of the coefficient of thermal expansion throughout the carbon substrate depends mainly on the proportion of fine spherical carbon particles therein. In order to obtain a substrate that is thermally stable over the temperature range of 400 to 1000° C., the finished substrate should contain between about 25 and about 50 weight percent fine spherical carbon particles. To obtain a substrate wherein the coefficient of thermal expansions varies by less than about $.3 \times 10^{-6} °C.^{-1}$ when measured with and across the grain, the substrate should be at least 33 weight percent spherical particles. The particle size of the calcined gilsonite coke, fluid coke, or other spherical carbon particles employed in the present invention is not narrowly critical. Particle sizes between about 10 and 150 mesh (based on Tyler standard screen size) have been found to be suitable. However, larger and smaller particle sizes in combination may be preferred.

The fine spherical carbon particles are bound together in the substrate material by means of a carbonaceous binder, such as coal tar pitch, petroleum pitch, or mixtures thereof. In addition to the binder, filler material, such as carbon flour or gilsonite flour is used to occupy the voids between the spherical particles and to produce a stronger substrate material. The amount of filler material used can vary widely, depending on the size of the spherical particles and the particular properties desired in the final substrate.

The coefficient of thermal expansion of the carbon substrate depends mainly on the coefficients of thermal expansion of the various ingredients therein. Since calcined gilsonite coke has a coefficient of thermal expansion higher than most other cokes or graphites, the coefficient of thermal expansion of the substrate can be increased by increasing the proportion of calcined gilsonite coke contained therein. Of course, the type and proportions of the various ingredients in the substrate should always be chosen to produce a substrate having a coefficient of thermal expansion closely approaching that of the particular coating material employed at the particular temperatures to which the coated article is to be exposed.

Thus, it can be seen that by adjusting the proportions of calcined gilsonite coke particles and graphitized fluid coke particles in the carbon substrate, the substrate material not only can be made isotropic, but also can be made to have a relatively high coefficient of thermal expansion. In fact, the substrate can be made to have a coefficient of thermal expansion sufficiently high that it can be used as a substrate for a silicon carbide coating, and the resulting coated article will be thermally stable.

A large variety of coating materials are suitable for use in the present invention. The preferred coating material is silicon carbide, but other suitable coating materials are tungsten carbide, hafnium boride, tantalum carbide, titanium boride, zirconium carbide, zirconium boride, molybdenum silicide, and the like. Even in cases where the coefficient of thermal expansion of the coating material is too high to be matched by the subject substrate material, the coated article is still substantially improved because of the isotropy and relatively high coefficient of thermal expansion of the substrate. Methods for applying the aforementioned coating materials to carbonaceous substrates are well known and, therefore, need not be described in detail herein.

After the desired substrate mixture for a particular coating material has been formulated to produce the desired coefficient of thermal expansion and degree of isotropy, the mixture is formed into the desired substrate shape by any suitable forming operation, numerous examples of which are well known to those skilled in the art. The formed article is then baked and graphitized in any conventional manner.

The coated article is completed by applying the desired coating to the carbon substrate in such a way that it adheres to the substrate. For example, a silicon carbide coating may be applied by packing the carbon substrate in powder mixtures of silicon metal and/or silicon dioxide with titanium carbide and then heating the substrate to temperatures in the range of 1500 to 2100° C. This coating process is described in detail in a copending United States patent application bearing Ser. No. 843,363, entitled "Process for Coating Carbonaceous Articles," filed Sept. 30, 1959, this application and the subject application being the property of a common assignee. This application issued as U.S. Patent 3,095,316 on June 25, 1963.

A specific example of a process for making the articles of the invention is the following. A blend was prepared with the following compositions by weight.

| | Parts |
|---|---|
| Calcined gilsonite spherical coke particles | 25.0 |
| Graphitized fluid spherical coke particles | 15.0 |
| Calcined gilsonite coke flour | 27.8 |
| Graphite flour | 12.6 |
| Gas black | 9.6 |
| Pitch (175° C. milled 100% through 35 Tyler mesh) | 19.5 |
| Sulfur (milled 100% through 35 Tyler mesh) | 4.5 |

The calcined gilsonite coke particles were fine spheres of a size through 10 and on 100 Tyler mesh. The graphitized fluid coke particles were fine spheres of a size through 35 and on 150 Tyler mesh.

The filler materials used were gilsonite coke flour which was milled from gilsonite coke to a size of 100 percent through 35 Tyler mesh and 55 percent through 200 Tyler mesh, and graphite flour from a petroleum coke base milled to pass 100 percent through 35 Tyler mesh and 45 percent through 200 Tyler mesh. The initial blend was placed in an electrically and thermally insulated mold and cured at a temperature of 320° C. by resistance heating under a pressure of about 1000 p.s.i. After the article had been thus formed, it was removed from the mold and baked at about 750° C. in a coke pack. After baking, the article was impregnated with #15 vacuum pitch and rebaked to about 750° C. and then electrically graphitized. The resulting graphite article had the following properties:

| | With Grain | Across Grain |
|---|---|---|
| Bulk Density (g./cc.) | 1.82 | 1.82 |
| Resistivity (10⁻⁴ ohm-cm.) | 12.60 | 14.20 |
| Young's Modulus (lbs./in.²×10⁶) | 0.73 | 0.61 |
| Modulus of Rupture (lbs./in.²) | 2,460 | 2,110 |
| Compressive Strength (lbs./in.²) | 13,425 | 13,450 |
| Tensile Strength (lbs./in.²) | 2,524 | 1,677 |
| Coefficient of Thermal Expansion: | | |
| (30–100° C.) $10^{-6}$/° C | 3.4 | 3.8 |
| (400–1,000° C.) $10^{-6}$/° C | 5.3 | 5.6 |
| Thermal Conductivity (B.t.u./hr.-ft., ° F.) | 49.0 | 44.3 |
| Admittance (cm.²/sec.) | 2×10⁻² | 6×10⁻³ |
| Permeability (Darcy's) | 0.0007 | 0.0004 |
| Ash (w./percent) | 0.129 | 0.159 |

As can be seen from the above data, the graphite substrate material was substantially isotropic and with respect to the coefficient of thermal expansion, the measurements with and across the grain differed by only $0.3 \times 10^{-6}$° $C.^{-1}$.

The above described graphite substrate which was 17 inches long and 18 inches in diameter was cut into a plurality of randomly oriented smaller articles, which were then coated with silicon carbide by packing them in a powder mixture of silicon metal and titanium carbide and heating them therein to a temperature of 1970° C. for 300 minutes. An extremely uniform silicon carbide coating pickup of 36 mg./cm.² resulted. The coefficient of thermal expansion of the silicon carbide coating was $5 \times 10^{-6}$° $C.^{-1}$. Each article which measured 1.25" x 1.0" x 8.0" was subjected to an oxidation-thermal shock test by placing it in a furnace in air, heating it to 1000° C., maintaining it at that temperature for one hour, and cooling it. The article was weighed and examined for cracks both before and after the test. This test was repeated nine times on the same bar with no resultant loss in weight and no crack formation.

It will of course be understood that the above described invention is susceptible to numerous modifications. For example, the forming of the initial substrate into an integral article may be achieved by extrusion rather than by molding, and the binding operation may be carried out by some method other than the pressure curing described above, such as by employing a nonthermosetting binder.

While various specific forms of the present invention have been illustrated and described herein, it is not intended to limit the invention to any of the details herein shown.

What is claimed is:
1. A thermally stable carbon article having an essentially isotropic coefficient of thermal expansion which is characterized by being thermally stable over the temperature range of from about 400° C. to about 1000° C. comprising by weight from about 25 to about 50 percent fine spherical graphite particles with the remainder being essentially a filler material selected from the group consisting of graphitized carbon flour, graphitized gilsonite flour and mixtures thereof plus minor amounts of binder selected from the group consisting of graphitized coal tar pitch, graphitized petroleum pitch and mixtures thereof.

2. The article of claim 1 wherein said fine spherical graphite particles are between about 10 and about 150 mesh size based on a standard Tyler screen.

3. The article of claim 1 wherein at least part of its outer surface is provided with a coating of silicon carbide, said coating having a coefficient of thermal expansion which essentially matches the coefficient of expansion of said carbon article.

References Cited

UNITED STATES PATENTS

| 3,028,256 | 4/1962 | Simnad | 117—106 |
| 3,095,316 | 6/1963 | Hartwig | 117—106 |
| 3,167,449 | 1/1965 | Spacil | 117—228 |
| 3,252,824 | 5/1966 | Whaley et al. | 117—228 |
| 2,799,609 | 7/1957 | Dalton | 161—162 |
| 2,804,417 | 8/1957 | Cross et al. | 161—162 |
| 2,837,772 | 6/1958 | Deakin | 18—59 |
| 3,002,231 | 10/1961 | Walker et al. | 18—59 |

ROBERT F. BURNETT, Primary Examiner.

EARL M. BERGERT, ALEXANDER WYMAN, Examiners.

W. J. VANBALEN, Assistant Examiner.